(12) United States Patent
Wisdom et al.

(10) Patent No.: US 11,790,254 B2
(45) Date of Patent: Oct. 17, 2023

(54) METHOD AND SYSTEM FOR DETECTING MODEL FILE CONTENT

(71) Applicant: TURBOSQUID, INC., New Orleans, LA (US)

(72) Inventors: Matthew Wisdom, New Orleans, LA (US); Mark C. Kurt, New Orleans, LA (US); Christopher P Phillips, New Orleans, LA (US)

(73) Assignee: Shutterstock, Inc., New York, NY (US)

( * ) Notice: Subject to any disclaimer, the term of this patent is extended or adjusted under 35 U.S.C. 154(b) by 190 days.

(21) Appl. No.: 17/111,879

(22) Filed: Dec. 4, 2020

(65) Prior Publication Data
US 2022/0180223 A1     Jun. 9, 2022

(51) Int. Cl.
*G06F 16/248* (2019.01)
*G06N 5/04* (2023.01)
(Continued)

(52) U.S. Cl.
CPC ............ *G06N 5/04* (2013.01); *G06F 16/2379* (2019.01); *G06F 16/248* (2019.01); *G06F 16/284* (2019.01); *G06N 20/00* (2019.01)

(58) Field of Classification Search
CPC ...... G06N 5/04; G06N 20/00; G06F 16/2379; G06F 16/284; G06F 16/248
(Continued)

(56) References Cited

U.S. PATENT DOCUMENTS

| 8,817,021 B1 * | 8/2014 | Hickman ................ G06T 15/00 345/426 |
| 2004/0031015 A1 * | 2/2004 | Ben-Romdhane ........ G06F 8/75 717/107 |

(Continued)

FOREIGN PATENT DOCUMENTS

CN          102609407 A       7/2012

OTHER PUBLICATIONS

US/RO—International Search Report and Written Opinion dated Feb. 25, 2022 for the related International Application No. PCT/US2021/061869; 8 pgs.

(Continued)

*Primary Examiner* — Amy Ng
*Assistant Examiner* — Antonio J Caiado
(74) *Attorney, Agent, or Firm* — McDermott Will & Emery LLP

(57) ABSTRACT

The present invention provides a computerized method and system for detecting modeling content within a model file without rendering the model file, the method and system including loading the model file into a detection engine, the model file including software code therein. In the method and system, the detection engine scans the model file, detecting descriptor terms within software code. The method and system includes generating a description list for the model file based on the plurality of descriptor terms and executing a conversion engine to review the description list relative to a relational database, the conversion engine (Continued)

electronically generating file terms describing the modeling content within the model file based on input from the relational database. Whereby, the method and system generates a content list for the model file based on the file terms, the content list thereby associated with the model file.

20 Claims, 8 Drawing Sheets

(51) Int. Cl.
  *G06F 16/28* (2019.01)
  *G06N 20/00* (2019.01)
  *G06F 16/23* (2019.01)
(58) Field of Classification Search
  USPC .......................................................... 706/12
  See application file for complete search history.

(56) References Cited

U.S. PATENT DOCUMENTS

| | | | | |
|---|---|---|---|---|
| 2006/0119618 | A1* | 6/2006 | Knighton | G06F 3/04815 707/E17.031 |
| 2009/0083208 | A1* | 3/2009 | Raghavan | G16H 70/60 706/47 |
| 2011/0047388 | A1* | 2/2011 | Park | G06F 21/6209 380/283 |
| 2014/0181792 | A1* | 6/2014 | Fanning | G06F 8/60 717/124 |
| 2015/0046953 | A1* | 2/2015 | Davidson | H04N 21/44008 725/74 |
| 2015/0134651 | A1 | 5/2015 | Holzer et al. | |
| 2017/0277363 | A1* | 9/2017 | Holzer | G06F 3/0481 |
| 2017/0278289 | A1* | 9/2017 | Marino | G06T 11/60 |
| 2019/0141100 | A1* | 5/2019 | Zhou | H04L 61/5007 |
| 2020/0184738 | A1* | 6/2020 | Ngo | H04W 4/90 |
| 2020/0241922 | A1* | 7/2020 | Matusik | G06F 9/5005 |
| 2021/0217158 | A1* | 7/2021 | Holzer | G06F 3/04815 |
| 2021/0383106 | A1* | 12/2021 | Maggio | G06F 18/2431 |
| 2022/0116679 | A1* | 4/2022 | Barvo | H04N 21/2187 |

OTHER PUBLICATIONS

Varga, A., et al. "An Overview of the OMNeT++ Simulation Environment." Proceedings of the 1st International Conference on Simulation Tools and Techniques for Communications, Networks and Systems & Workshops. 2008. Mar. 3, 2008 (Mar. 3, 2008)—Retrieved on Jan. 29, 2022 (Jan. 29, 2022} from <https://doc.omnetpp.org/workshop2008/omnetpp40-paper.pdf> 10 pgs.

* cited by examiner

FIG. 10

| OBJECT TREE | | | | | |
|---|---|---|---|---|---|
| | ADD NEW 🔍 | ☑ SHOW COMPLETED | | | ↻ |
| CATEGORY | | | | | |
| NAME | | UNAPPROVED | APPROVED | COMPLETION | LAST UPDATED |
| 1  | ANIMAL<br>OBJECT→NATURE→ANIMAL | 84 | 33097 | 100% | 08/31/20 |
| 2 ⊞  | AMPHIBIANS<br>OBJECT→NATURE→ANIMAL→AMPHIBIANS | 1 | 503 | 100% | 08/30/20 |
| 3 ⊞  | ANIMAL ANATOMY<br>OBJECT→NATURE→ANIMAL→ANIMAL ANATOMY | 9 | 2069 | 100% | 08/31/20 |
| 4 ⊞ 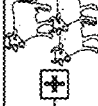 | BIRD<br>OBJECT→NATURE→ANIMAL→BIRD | 4 | 3116 | 100% | 08/31/20 |
| 5 ⊞ 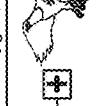 | EXTINCT ANIMAL<br>OBJECT→NATURE→ANIMAL→EXTINCT ANIMAL | 4 | 2504 | 100% | 08/30/20 |
| 6 ⊞ 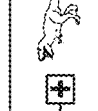 | INVERTEBRATE<br>OBJECT→NATURE→ANIMAL→INVERTEBRATE | 18 | 3996 | 100% | 08/31/20 |
| 7 ⊞ 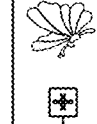 | MAMMALS<br>OBJECT→NATURE→ANIMAL→MAMMALS | 27 | 13306 | 100% | 08/31/20 |
| 8 ⊞ 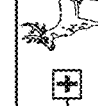 | REPTILE<br>OBJECT→NATURE→ANIMAL→REPTILE | 11 | 1511 | 99% | 08/31/20 |
| 9 ⊞ 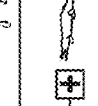 | SEA CREATURES<br>OBJECT→NATURE→ANIMAL→SEA CREATURES | 7 | 6303 | 100% | 08/31/20 |

FIG. 11

METHOD AND SYSTEM FOR DETECTING MODEL FILE CONTENT

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent files or records, but otherwise reserves all copyright rights whatsoever.

FIELD OF INVENTION

The present invention relates generally to multi-dimensional electronic model content and more specifically to detecting model content within a model file.

BACKGROUND

In video game and other graphic generation systems, it is common to use predetermined multi-dimensional models. These models, typically 3D models, are pre-generated content uploaded and included into a graphic rendering engine. By way of example, a model may be a vehicle, allowing a game developer to upload and insert the model into the game in lieu of having to create a new model from scratch.

There are existing marketplaces for acquiring models, whether by purchase or free-to-use. These models are typically created by third parties and then made publicly available.

Problems exist on multiple levels with the current technology. For example, there are numerous file formats. When you include 3D printing and CAD software, there are the potential for hundreds of different file formats requiring different rendering engines to view the model content.

Another problem is with determining the content of the model encoded within the model file. The model content can represent third-party intellectual property, often without third-party approval. For example, the model content can represent actual items subject to trademark and/or trade dress protection. It is important for users to know the model content prior to acquisition and use.

Currently, model content creators provide written descriptions of file contents. For example, a person loading a model file to a commercial site can provide a list of descriptive terms, e.g. car, coupe, racing, red color, 20 inch wheels, spoiler, etc. This technique relies on the accuracy and completeness of the person entering the terms. This can be misleading, incomplete, or inconsistent with standard nomenclature.

Another example of content is for an inspector to review file meta data, maybe even manually open the model file to visually inspect the model content, and provide written description content. A full rendering of all models can be a time consuming process. Based on the large number of file formats and the large number of model files, this is an onerous task not feasible in a typical model file platform. Additionally, using manual input again relies on the completeness and accuracy of user-generated input.

Confusing, misleading, or even incomplete descriptions complicate access to and use of model files. Users can have difficulty finding the best model files via searching interfaces. For example, many users search based on file names, thus multiple terms for the same item can complicate finding content, such as using a search term "couch" versus search term "sofa." Additionally, users can purchase or import model content without realizing a potential misuse of third-party intellectual property.

A third problem arises with proprietary content contained within models. Using the above example of a vehicle, the model may represent a well-known vehicle (e.g. a Jaguar® X-type convertible). But the manufacturer of the vehicle (e.g. Tata Motors) may not authorize the use of this model in the subsequent graphic rendering environment. Additionally, the use of the model within the rendering can also be outside acceptable uses. For example, if the rendering is a videogame where the player uses the car to evade law enforcement and engage in illegal activities, the manufacturer can object to the use of the vehicle likeness.

With lack of knowing content of a model file, it becomes equally problematic tracking possession, distribution, and use of modeled proprietary content. Therefore, it is important to not only understand what is in a model, but also tracking model information for subsequent usage.

As such, there exists a need for an improved method and system that detects modeling content within a model file.

BRIEF DESCRIPTION

The present invention provides a method and system for detecting modeling content within a model file. The model file represents multi-dimensional model data, such as a 3D model usable in a graphic processing or rendering environment. The model file can be any suitable file extension executable by a modeling software executable to create, use, or manipulate the model data. Common example include computer-aided drawing software and video game or other graphics rendering engines.

The method and system detects modeling content with the model file without requiring rendering of the model file using its modeling software executable. The method and system includes loading the model file into a detection engine. The detection engine can be a software application that reads the software code within the model file. Whereas a rendering engine reads the software code to render the model, the detection engine scans the software code of the model file and detects various descriptor terms within the software code. For example, the detection engine can scrape the model file to grab every English word or phrase, these words or phrases can include creator notes and comments fields, as well as other terms.

The scanning generates a description list for the model file, this list is based on the detected descriptor terms. The descriptor terms can be from user-generated content embedded within the model file, for example encoded notes written into the software code by the programmers. The descriptor terms can also be from auto-generated terms written in to the code from model generation or model drafting software. The descriptor terms can be any other suitable terms including for example filename(s), model set information, etc.

The method and system may additionally use further techniques for finding terms. For example, one technique can include rendering the content of the model file and requesting user data entry. In this example, rendered content can be submitted to a third-party site for receipt of keyword descriptors. These further techniques can be used to supplement the description list.

The method and system therein improves on the description list by executing a conversion engine to review the description list. The conversion engine references the description list with a relational database, the relational database including additional terms, such as complimentary terms, synonymous terms, or other related terms. The relational database can also insert hierarchy or other structures to the terms. The relational database therefore expands the description list via the conversion engine generating file terms describing the modeling content.

The method and system therein generates a content list for the model file based on the file terms. The content list may be a summation of all file terms, including original descriptor terms. The content list may be available as searchable content. In another example, the content list may include the hierarchical structure of terms, ranging from a generic identifier to sub-parts or layered degrees of specificity. An example of hierarchy can be a top level term for anatomical matter, a sub-level of human, and a second sub-level of organs.

Therein the method and system includes associating the content list with the model file. This association may be performed in any number of suitable manners, including revising the model file itself or maintaining a reference database of content lists with a file identifier associated with the model file.

The method and system can operate with a model file repository. For example, the method and system can operate concurrent with uploading a model file to the repository. In another example, the method and system can scan an existing repository for already loaded content.

With a model file repository, the content lists for the various model files provide additional accessibility via searching operations. For example, a user accessing a repository can conduct a more comprehensive search operation for a desired model file. Search functions can access a database of content lists, thereby referencing associated search model files.

The method and system can additionally operate with content generator feedback. For example, the model file creator can receive the content list associated with the model file. The creator can generate additional terms or revise terms. The method and system can then process these additional terms.

The method and system may additionally use machine learning to further review and refine the content list relative to the relational database. For example, machine learning can include learning operations to determine additional relationships between terms. The machine learning can include updating and improving the relational database as well as accuracy and completeness of the content list.

Whereby the method and system detects modeling content, the method and system additionally uses this modeling content for searching and data tracking operations. Where the modeling content may include proprietary content, the associated content list is usable for tracking storage, sales, distribution, and use of the model file and the modeling content. The method and system can provide brand detection via determining intellectual property rights associated with or contained in the model files. Based on associating the content list with the model file, record keeping is now available to determine who has acquired and uses different model files, including ensuring a model file repository does not improperly distribute content. Or if content is distributed, the acquirers have been notified of the appropriate use rights and obligations associated with a model file.

Therefore, the present method and system improves access to, tracking, and monitoring distribution of model files.

BRIEF DESCRIPTION OF THE DRAWINGS

FIGS. 10-12 illustrate sample screenshots of model files accessible within a hierarchical structure based on the content detection.

A better understanding of the disclosed technology will be obtained from the following detailed description of the preferred embodiments taken in conjunction with the drawings and the attached claims.

DETAILED DESCRIPTION

As described herein, the method and system detects modeling content within a model file.

Figure 1:
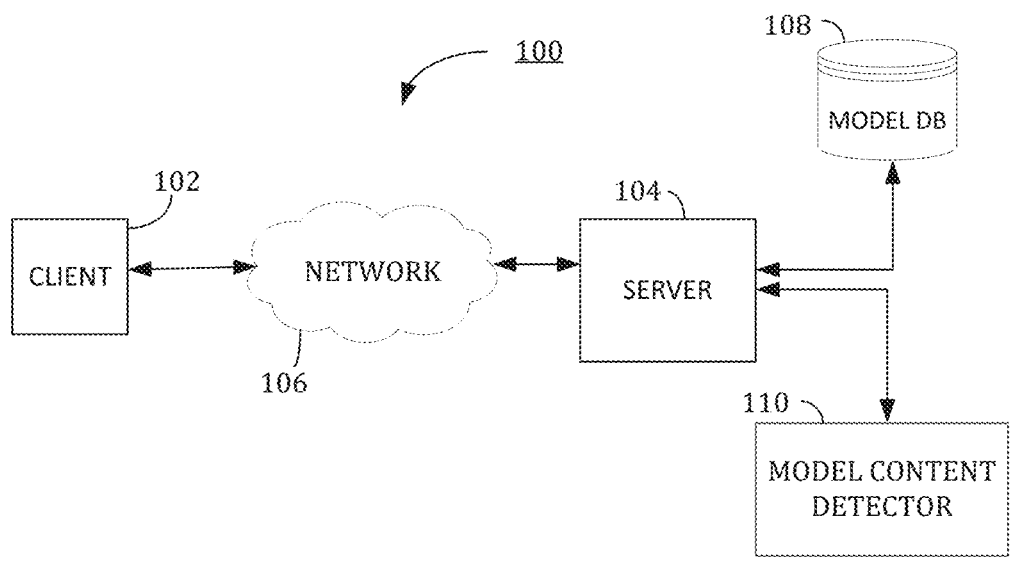
FIG. 1 illustrates a computing system providing for detecting modeling content of a model file.

FIG. 1 illustrates a general computing environment 100 with a client device 102 accessing a server 104 across a network 106. The server 104 communicates with a model database 108 and a model content detector 110.

The client device 102 can be any suitable type of device for connecting to the network 106 and accessing server 104. For example, the client device 102 can be a computer from a model developer for uploading content. The client device 102 can be a customer computer or computing device seeking to search, purchase from, or otherwise access content via the server 104.

The server 104 can be one or more computing devices operative to perform server-based content management operations. For example, the server 104 can represent a network-side computing device or cloud-based distributed computing environment running an access portal for model files. In one embodiment, the server 104 can be a commercial online repository accessible via the network 106 for uploading and downloading model files. The server 104 can also be a proprietary depository of content, such as a video game developer or a graphic studio maintaining their own database of content.

The network 106 is any suitable network such as a public accessible internet or a private network. Computer-to-computer access across the network 106 can be performed using known communication protocols.

The model database 108 can be a unitary or distributed data repository of model files and related model content. The database 108 can be local to the server 104 or across a distributed environment. Interaction between the server 104 and database 108 can be performed using known data storage and retrieval techniques. Interactions can include storing model files, retrieving model files, searching model files, etc.

The system 100 further includes a model content detector 110 performing processing operations for detecting modeling content. The detector 110 can be disposed within the server 104 or in a stand-alone processing environment as shown in FIG. 1. For example, in one embodiment, the model content detector 110 can be an executable routine within the server 104. In another embodiment, the detector 110 can be a stand-alone executable via network access.

The system 100 of FIG. 1 operates to detect modeling content within a model file without requiring rendering of the model file. Model files represent two or three dimensional digital content, typically used in a graphics rendering environment, but also usable in further modeling environment such as 3D printers.

Figure 2:
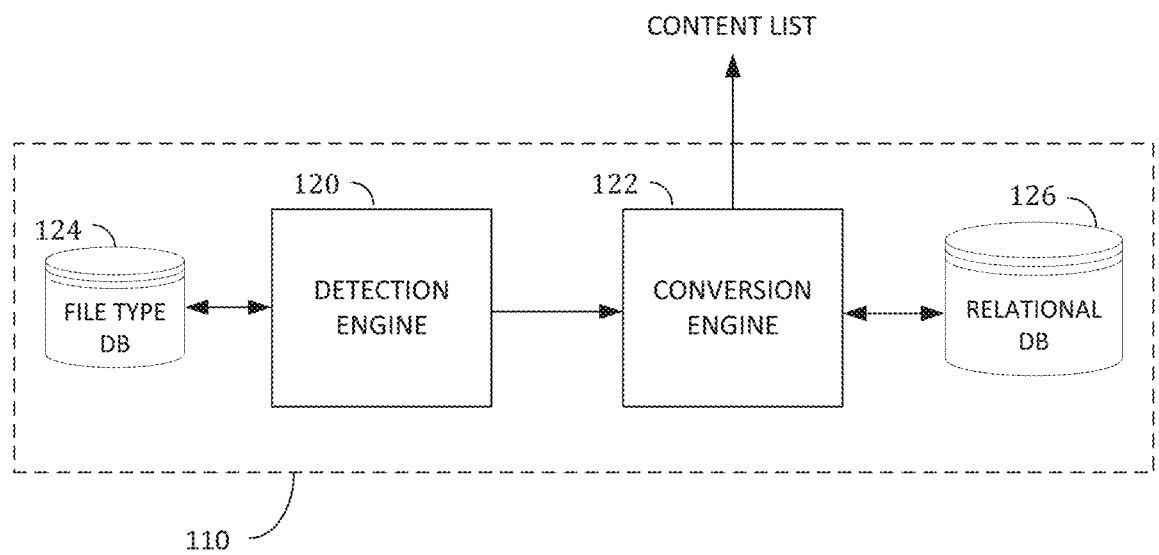
FIG. 2 illustrates an expanded view of one embodiment of a model content detector of FIG. 1.

FIG. 2 provides a further exemplary display of one embodiment of the model content detector 110. The detector 110 in FIG. 2 includes a detection engine 120 and a conversion engine 122. The detection engine 120 can access a file type database 124, the conversion engine 122 accessing a relational database 126.

The detection engine 120 can be an executable application executed on one or more processing devices. The engine 120, in response to executable instructions, scans an incoming model file without requiring formal rendering of the file. Scanning the file includes reviewing the software code of the file, as well any other associated data or content accessible by the detection engine 120. For example, scanning can include reviewing a file name. By contrast, rendering of the model file would require execution by an applicable rendering application to construct the model.

The conversion engine 122 can be one or more processing devices reviewing and converting the detection engine output, including referencing additional data sets and/or database(s).

Relative to the system 100 of FIG. 1, one embodiment includes loading the model file into the detection engine 120. A client device 102 may upload a model file to the server 104 across the network 106. As the file is uploaded, the server 104 can then load the model file into the engine 120 of detector 110.

The detection engine 120, in response to executable instructions, scans the software code of the model file, reviewing the actual letters and numbers of the model file and not formally rendering the model.

The detection engine 120 reviews the software code to detect multiple descriptor terms within the software code. By way of example, the software code can include developer notes and comments. The detection engine 120, scanning this software code, can perform content recognition operations to extract terms recognized as descriptor terms. In this example, the model developer may include notes indicating the model file renders a vehicle, the notes include a description of the vehicle make and model. These vehicle make and model terms are descriptor terms. Whereby, the engine 120 assembles the terms into a descriptor list.

As the detection engine 120 may not render the model file, the engine 120 does not require or use model file specific rendering software. It is recognized that file type extensions typically designate the rendering software to render the model file, but the detection engine 120 can be file type agnostic.

In one embodiment, the file type can be beneficial for reviewing the software code. Therefore a file type database 124 can include additional information relating to different model software code usable for improving the detection engine. Thus, while the detection engine 120 may not render the model itself, file type encoding features can be recognized and used to further assist analysis of the software code. For example, a file type may have a specific format for comments or system-generated tags more readily detectable with file type specific information.

In the detector 110, the conversion engine 122 improves upon the description list. In this embodiment, the conversion engine 122 accesses a relational database 126 using the description list. The relational database 126, via its relational content, expands and refines the scope of terms labeling the model content within the model file. The relational database provides a deeper taxonomy of terms.

The conversion engine 122, in this embodiment, upon accessing the relational database 126, generates a content list for the model file. As described in further detail below, this content list is an expanded or refined list. The conversion engine 122 can then distribute the content list for associating with the model file. In the FIG. 1 example, the content list can be distributed to the model database 108 and properly associated with the original model file.

Figure 3:
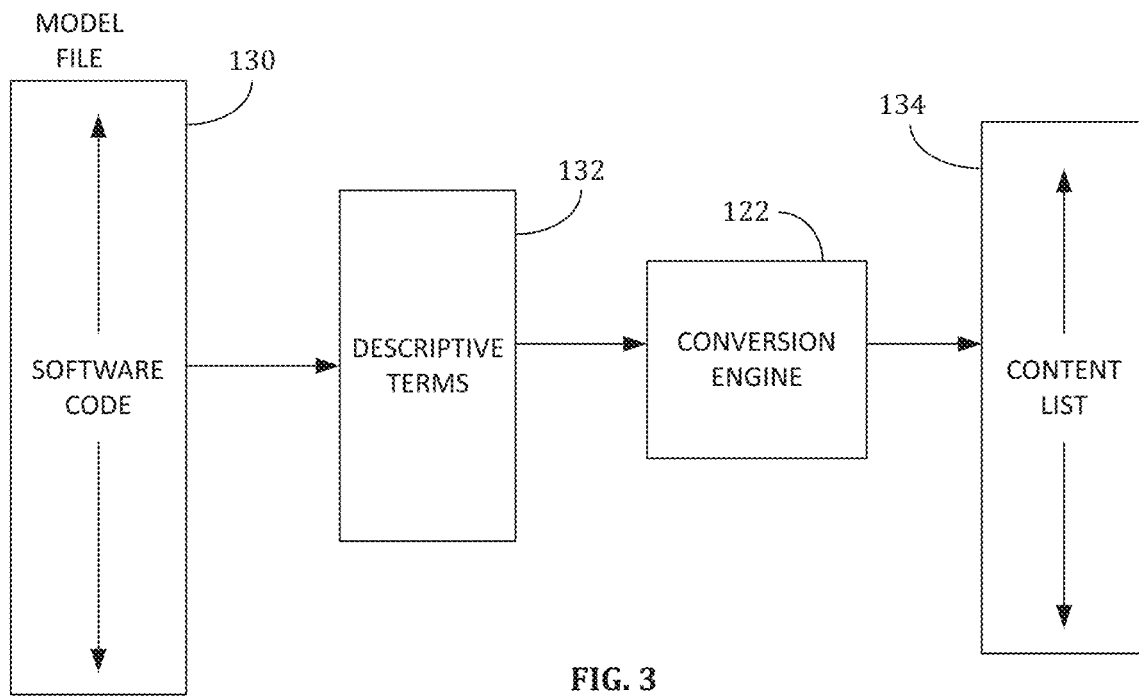
FIG. 3 illustrates a data block flow diagram illustrating one embodiment of model file content detection.

FIG. 3 illustrates one example of the computing process for detecting modeling content. FIG. 3 illustrates the model file 130 having software code therein. As noted above, a rendering application executes the software code to generate the model. Whereas, in the present method and system, this software code is not rendered but rather is read for the descriptive terms embedded therein.

Descriptive terms 132 are extracted from the software code. In this example, the terms 132 are a data structure or data field with multiple terms, such as a structured or an unstructured list. These terms are limited in nature, dependent on being included in the software code of the model file 130.

Whereas, the terms 132 are then processed via the conversion engine 122. The conversion engine 122 can then expand and refine the list using any suitable referential content, such as one embodiment including a relational database. In one example, the conversion engine can determine synonyms or alternative terms describing the model file. For example, the software code may include the term "car" with the conversion engine including synonyms of "vehicle," "auto," and "automobile." For example, the software code may include "car" and "four doors" with the conversion engine including the related term "sedan."

The refinement of the descriptive terms 132 from the conversion engine 122 generates the content list 134. This list 134, similar to the descriptive terms 132, can be a data structure or data field with multiple terms. The content list can also include a referential identifier linking the content list 108 to the model file 130.

Figure 4:
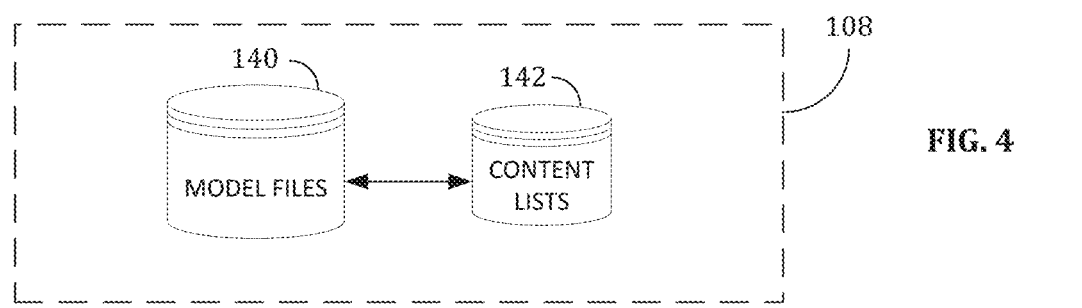
FIG. 4 illustrates an expanded view of one embodiment of a model database of FIG. 1.

FIG. 4 illustrates one embodiment of the model database 108 of FIG. 1. In this embodiment, the database 108 includes two storage units, storage of model files 140 and storage of content lists 142. It is recognized, these can be stored in a shared memory or across different platforms. Varying embodiments can include local and/or cloud-based storage of model file(s) and content lists, including local or distributed storage embodiments.

The content lists 142 are associated with the model files 140, allowing for management of modeling content with the model files. Management of content can include accessibility to modeling content for commercial transactions or other forms of distribution. For example, the content lists 142 can be searchable content allowing for queries requesting specific modeling content via the model files 130. In the example of a commercial repository, the content lists 142 allow for broader and enhanced search results responsive to search requests.

Management of content can also include accountability and tracking of modeling content. This accountability can be for commercial transactions or forms of distribution. A model file may have proprietary content, such as a trademark, trade dress or other use rights. A commercial database can quickly determine model files 130 having proprietary content.

Brand management includes accounting for distribution and use limitations requested by proprietary content owners. As an example, a model may include a make and model of a car, the car manufacturer may allow general use but can prohibit the model being embedded in a video game or video and being used for illegal or immoral activities.

These use and distribution limitations can be referenced to the model file and tracked based on the content list. Whereby any acquisition or distribution of model files 130 can readily have use and distribution limitations made known by referencing the content list associated therewith.

Another example of proprietary content can be a proprietary content owner seeking to verify their proprietary content is not being sold or distributed in model files. Having the content list associated with the model file allows the server 104 of FIG. 1 to quickly and effectively audit its model file database 140. The method and system therein allows server 104 (FIG. 1) to audit its content under management.

Figure 5:
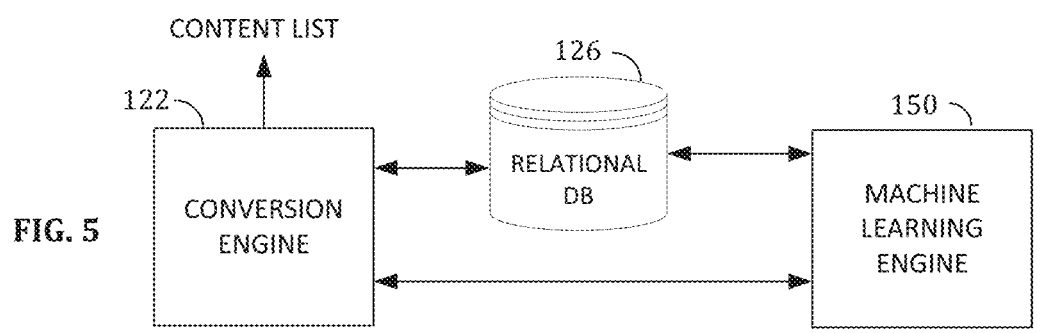
FIG. 5 illustrates one embodiment of a system for expanding model file content detection.

FIG. 5 illustrates a further alternative embodiment using a machine learning engine 150 to further expand or refine the content list 122. This embodiment, similar to FIG. 2, uses the conversion engine 122 operative with the relational database 126. Whereas, the machine learning engine 150 includes further processing operations to expand on the content list.

Machine learning operations can include any suitable or well-known machine learning techniques to expand or modify the content list. For example, machine learning can be based on data sets for determining second order relationships between multiple terms or descriptors.

Figure 6:
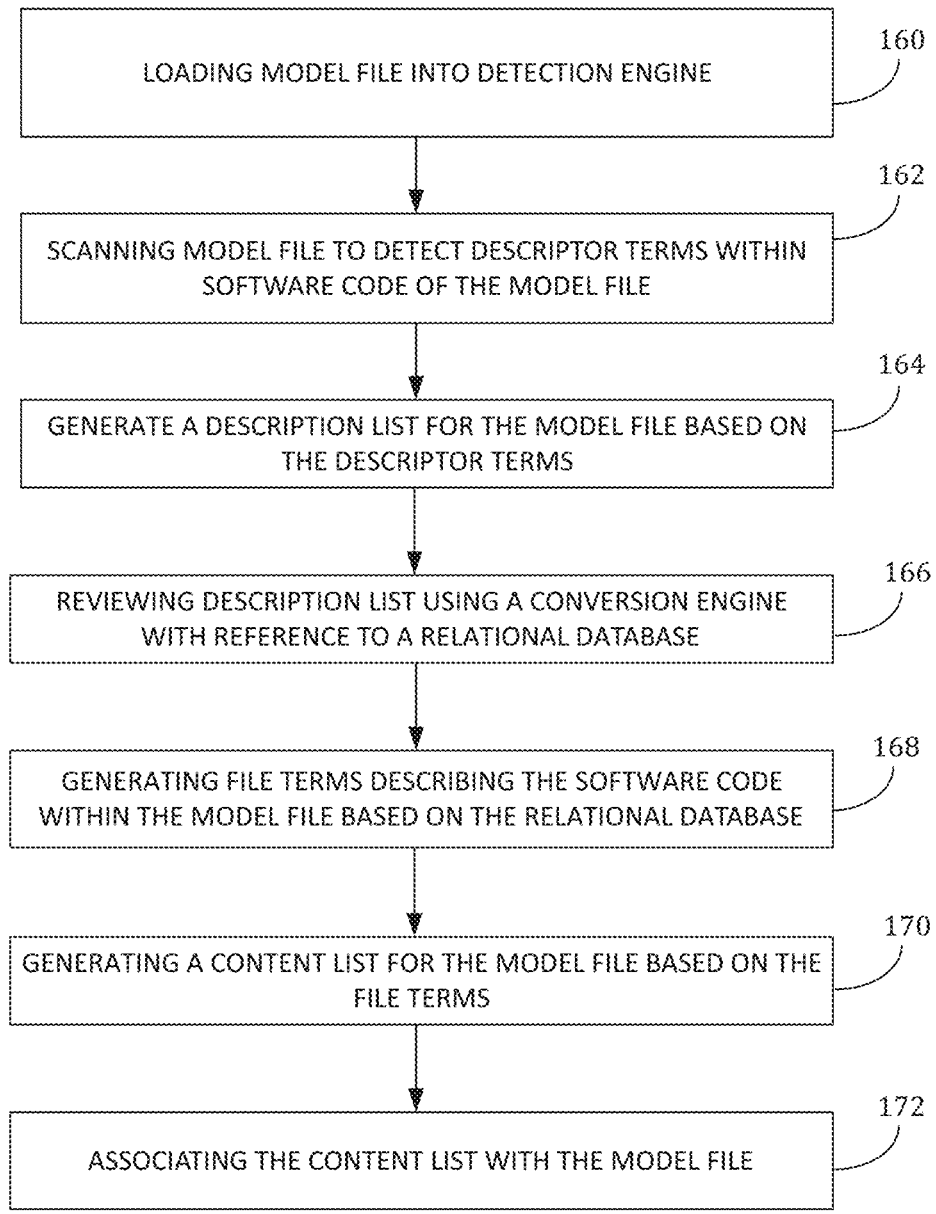
FIG. 6 illustrates a flowchart of the steps of one embodiment of a method for detecting modeling content of a model file.

FIGS. 1-5 describe one or more processing environments, FIG. 6 illustrates a flowchart of the methodology for detecting modeling content. The methodology may be performed using the processing environments of FIGS. 1-5 above.

In FIG. 6, step 160 is loading a model file into a detection engine. The loading step may be performed across a network or from a local repository. In one embodiment, FIG. 7 notes further embodiments for loading operations.

Step 162 is scanning the model file to detect descriptor terms within the software code of the model file. Where a rendering engine reads the software code to render the model, the scanning step reviews the software code for detecting operations, not graphical rendering operations.

Step 164 is generating a description list for the model file based on the descriptor terms. The description list is formed based on detected and extracted terms from the scanning step 162. The description list may also be generated from additional sources, as described in greater detail with respect to FIG. 7 below. The description list may be a text file with multiple terms.

Step 166 is reviewing the description list using a conversion engine with reference to a relational database. The description list may be limited in scope based on the detecting steps, the relational database thereby references additional terms using relational knowledge consistent with known relational database technology.

Step 168 is generating file terms describing the modeling content within the model file based on the relational database. The database, using relational patterns, expands the scope, breadth, and taxonomy of terminology. For example, FIG. 9 below illustrates an exemplary embodiment of expanding descriptive terms.

The description list is then transformed into a content list. Step 170 is generating a content list for the model file based on the file terms. The content list may also be a text file or a structured list.

The content list is further associated with, referenced to, the underlying model file, step 172. This model file and associated content list may then be stored, accessible by any suitable searching or distribution platform. The association between the content list and the model facilitates searching operations, commercial transactions, and brand management including tracking of model files and proprietary content in the model files, among other benefits.

Figure 7:
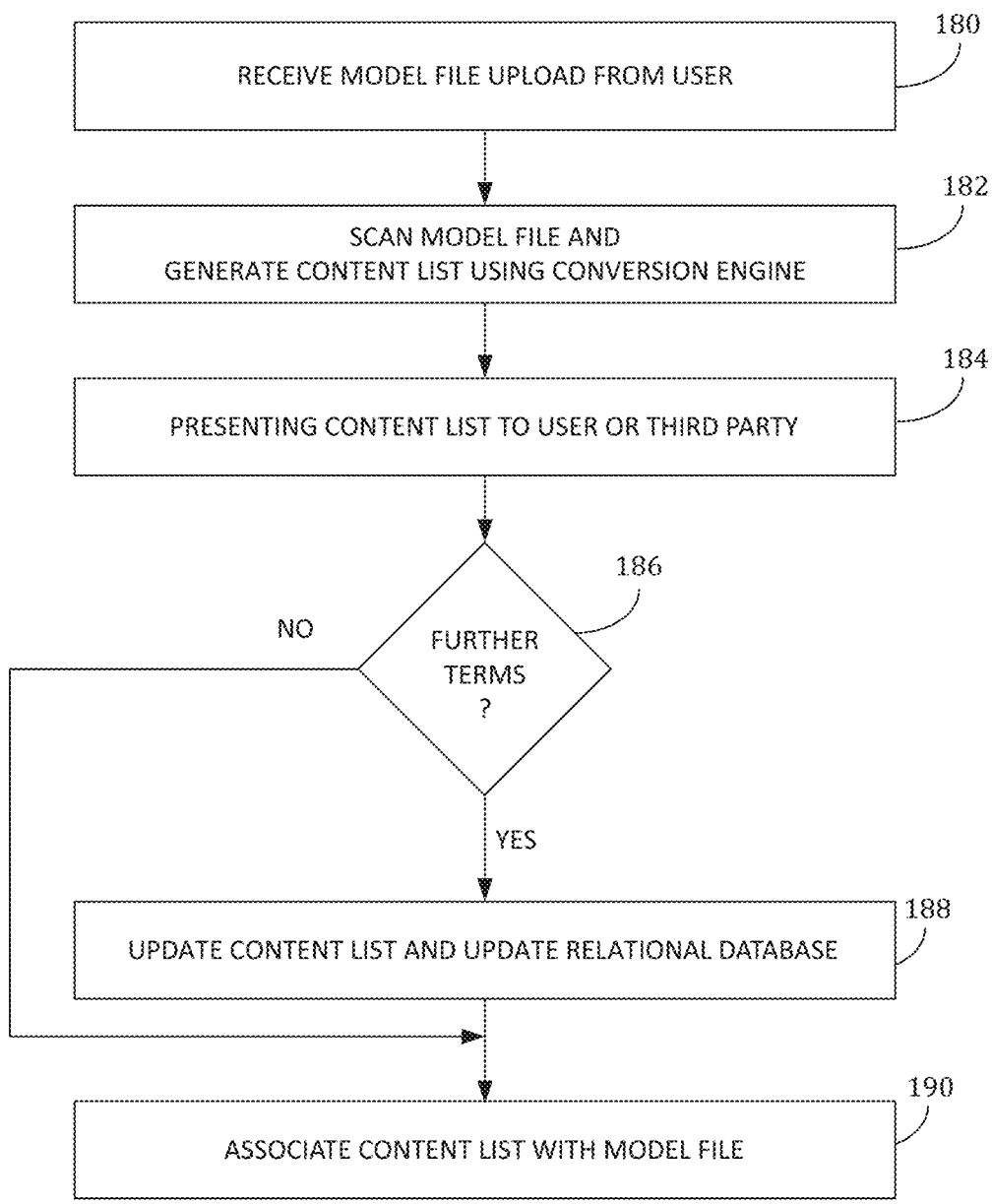
FIG. 7 illustrates a flowchart of steps of another embodiment of model file content detection of a model file.

FIG. 7 illustrates a flowchart of a further embodiment of model file content detection. Model file interaction can include uploading to a repository or distribution server. For example, a web site can host libraries of model files for purchase or download. Model file creators can upload files and make available for purchase. Therefore, the present method and system improves knowledge of the model file content without requiring execution and visual inspection of the model itself.

Step 180 is receiving a model file uploaded from a user. In this example, a user may access the web site or network location. The user may create an account or log-in to an existing account. The user can then upload the model file using any suitable known upload technology. Upload can include formal writing the model file to a local storage location or can include linking to an external database.

Step 182 is generating a content list using the conversion engine. This step can be consistent with steps 162-170 of FIG. 6. Where FIG. 6 flowchart is an automated process, FIG. 7 provides for interactivity or feedback.

Step 184 is presenting the content list to a user or a third party. Presenting includes interactive functionality for modifying or supplementing the content list. For example, the model creator may seek to include additional descriptive terms to the content list. A third party can represent an owner of proprietary rights encapsulated in the model file content, for example the third party adding further information on restrictions or use limitations.

Figure 8:
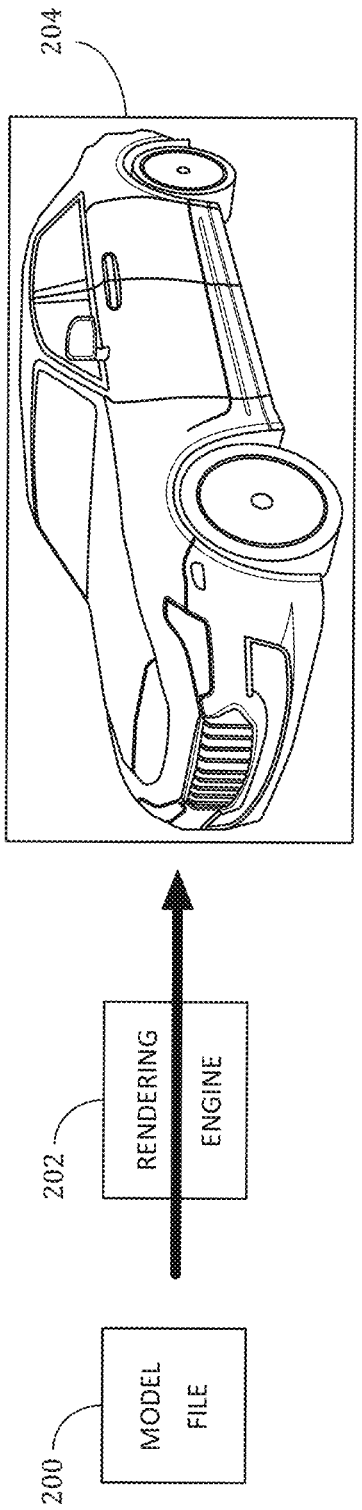
FIG. 8 illustrates a representation of an exemplary model file.
Figure 9:
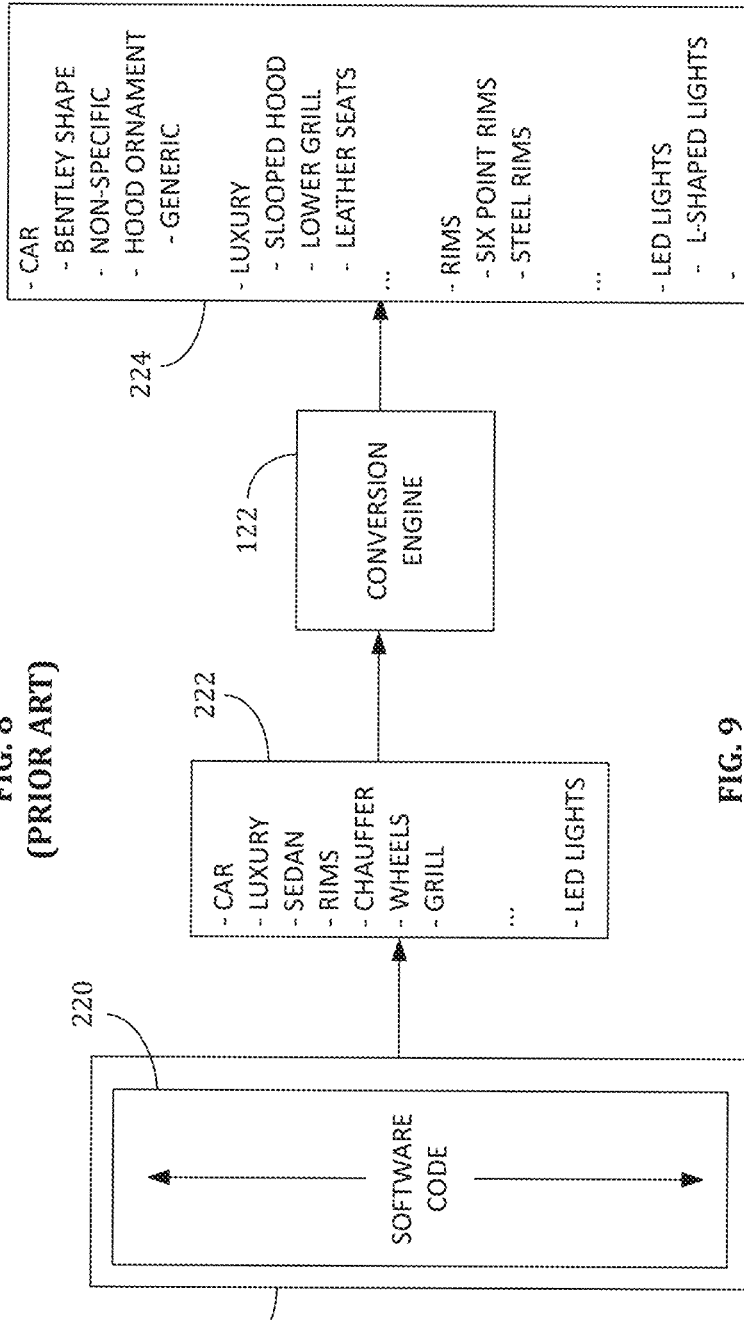
FIG. 9 illustrates an exemplary embodiment of the FIG. 3 data block flow diagram of the FIG. 8 model file.

Step 186 is a determination if further terms are added to the content list. If yes, step 188 is updating the content list and updating the relational database. Thereafter, or if no further changes are made, the method reverts to step 190 to associate the content list with the model file. Whereby FIG. 7 facilitates user interaction for enhancing the content list.

Where the above notes the method and system from operational and structural functions, FIGS. 8-9 illustrates a representative embodiment for detecting modeling content. FIG. 8 illustrates the prior art model file 200 executed by a rendering engine 202 to generate a 3D model. In this example, the model file has model encoding readable by the rendering engine 202 to create the model 204 of a vehicle.

FIG. 9 is similar to FIG. 3, herein with sample terminology relating to the model file 200 of FIG. 8. The model file 200 includes software code 220. As noted above, the software code 220 is readable by a rendering engine (e.g. engine 202 of FIG. 8) to render the model. The present method and system does not require rendering the model, but reviews the software code itself. The method and system can thereby be agnostic of the model file type.

Scanning the software code 220 detects descriptor terms 222. Using the model file 200, which renders a model of a vehicle (204 of FIG. 8), the detected terms may include: car, luxury, sedan, rims, chauffer, grill, LED lights, etc. These terms may be acquired by scanning the notes, comments, or other sections.

The descriptor terms are fed through the conversion engine 122, consistent with techniques described above. The conversion engine can therein expand the terms into a content list 224. In this example, the term car is expanded to include Bentley-shape, non-specific vehicle, hood ornament with a sub designation of generic. The term luxury can be expanded to note the sloped hood, a lower grill, leather seats, etc.

Further refinements can include subtracting default or non-descriptive terms. For example, a model developer can use extremely generic or overly broad terms having little or no actual value to describing the model content, whereby the generation of file terms can include the elimination of these terms.

The content list 224 can be independently generated by the conversion engine 122 or in other embodiments can include further feedback or modification techniques. For example, a machine learning engine can expand the scope using additional feedback operations. In another example, creator or third-party feedback is usable for modifying or expanding the list.

The method and system can further generate and expand upon taxonomies for descriptive terms. For example, aggregating the terms in the content lists 142 of FIG. 4 provides for a global data set usable for generating the description list. Aggregating all the terms in the content lists 142 is an aggregation of the terms within the models (of model files 140 of FIG. 4).

This expanded data set allows for improved reading and matching of existing terms within a new model file. For example, a model developer may use a limited or unique set of terms, but based on the aggregating terms, the method and system more accurately refines and expands the terms relative to commonly known and usable terms.

The aggregation of terms can be refined by term distributions. For example, a model database may have 20,903 airplane model files. Aggregating the content lists can reveal, for example, a term distribution of: wings 99%, seats 95%, wheels 92%, . . . Boeing 26%, propeller 24%, model 737 1%, etc. This creates the taxonomy usable by the conversion engine (e.g. engine 122 of FIG. 3) for generating the content lists (e.g. list 134 of FIG. 3).

The terminology and taxonomy can also be usable for categorizing content, such as creating an object tree. The inclusion of the object tree provides for improved categorization of model content. This improves accessibility to content, among other benefits.

Figure 10:
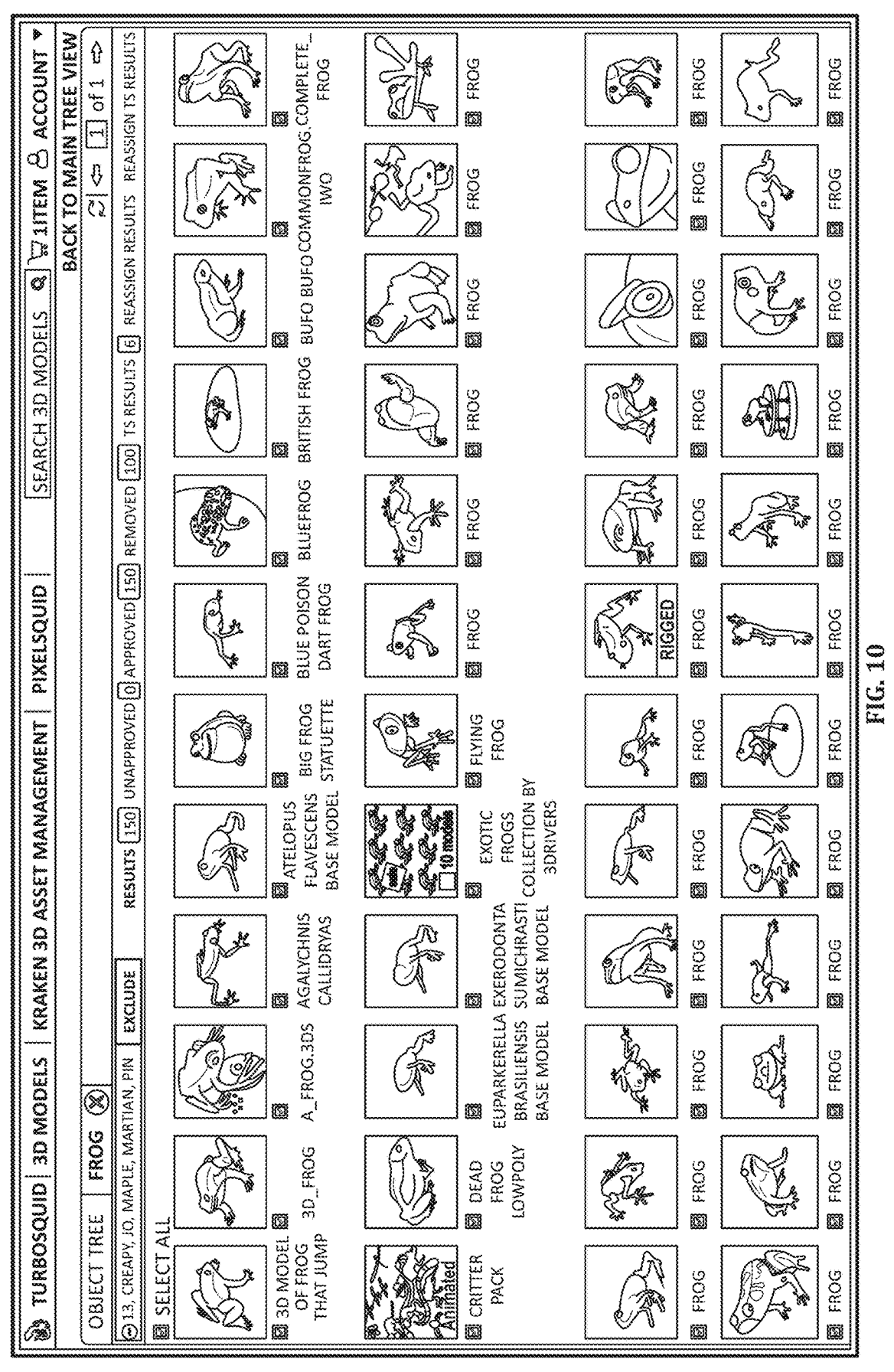

FIG. 10 illustrates a sample screenshot model file thumbnail images for frogs. A user accessing a server or processing system for acquiring model content can request one or more frog content files. Each of these files represented by the thumbnail are model content, which when rendered by the appropriate rendering software creates the multi-dimensional model content of the appropriate frog. As visible in the FIG. 10 screenshot, there are numerous examples of frogs, thus further deferential can be used to better quantify the model files using encoded data within the model files as well as relational terminology structure and hierarchy as noted herein.

FIG. 11 illustrates a sample hierarchy, an object tree of the files. This object tree illustrates the hierarchy of animals with subsets. The object tree illustrates the example of a top order being animal, with a first order subset being examples of: amphibian, animal anatomy, bird, extinct animal, invertebrate, mammal, reptile, sea creature, and others not illustrated. In this example, the model file is described within the hierarchy, in the example of the amphibians being "object—nature—animal—amphibians."

Figure 12:

This object tree is further divisible. FIG. 12 shows the sub category of frogs under amphibians, such as bullfrog, tree frog, cartoon frog, frog egg, etc. This hierarchy creates further terminology and differentiation for model content files. These hierarchy of terms can be assigned to the model files as part of the content list as generated by the conversion engine described above based on the descriptor terms detected within the model file software code. Having the assigned terminology additionally allows for categorizing the image files for accessibility by third parties accessing the model file repository.

The present method and system improves model file description through reviewing the software code. The determination and processing of this information allows for a more robust description of the model file without requiring the time-consuming processing of having to manually render and visually inspect every model file.

In a further embodiment, the present method and system can include supplementing the content list based on user input, including visual feedback. For example, one embodiment can include rendering the model file to visually inspect the model content. This can be done on the server 104 of FIG. 1 or can be via separate processing environments. One or more users can visually inspect the model content and enter descriptive terms. For example, one or more users can manually enter one or more descriptor terms based on viewing the rendered model content, such as a community or user input/feedback adding further descriptive content.

In another embodiment, visual inspection can be used to supplement or verify the generation of the description list. In an example of machine learning, the visual inspection and data entry can be used to refine machine learning algorithms to improve the accuracy and sufficiency of description lists. Machine learning operations can relate to processing the descriptive terms, including determining additional associations or connections between various terms. Machine learning may additionally include operations to visually inspect or graphically recognize rendered model content, such as using image recognition techniques, generating additional descriptive terms for broadening, expanding, or creating further associations.

FIGS. 1 through 12 are conceptual illustrations allowing for an explanation of the present invention. Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. Moreover, Applicant does not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveals the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein.

What is claimed is:

1. A computerized method for detecting modeling content within a model file, the method comprising:
   loading the model file into a detection engine, the model file including software code therein;
   electronically, via the detection engine, scanning the model file and detecting a plurality of descriptor terms associated with the software code, wherein the scanning the model file does not execute the model file for rendering the modeling content;
   generating a description list for the model file based on the plurality of descriptor terms;
   executing a conversion engine to review the description list relative to a relational database, the conversion engine electronically generating file terms describing the modeling content within the model file based on input from the relational database;
   identifying a layered degree of specificity of the file terms to insert a hierarchy structure into the file terms;
   generating a content list for the model file based on the file terms;
   associating the content list with the model file;
   transmitting a visual display of the modeling content to a third-party;
   receiving a keyword descriptor of the model content from the third-party;
   storing the keyword descriptor linked to the model file in a searchable database;
   receiving a search request having at least one search term to a model file repository; and
   retrieving the model file in response to receiving the search request when the search request includes the keyword descriptor according to the hierarchy structure and the content list includes one or more terms related to the at least one search term.

2. The method of claim 1, further comprising:
   receiving the model file for inclusion with a model file repository; and
   loading the model file into the detection engine prior to inclusion with the model file repository.

3. The method of claim 1, further comprising:
   retrieving the model file from a model file repository prior to loading the model file into the detection engine; and
   associating the content list with the model file within the model file repository.

4. The method of claim 1, further comprising:
   presenting the content list to a content creator;
   receiving a creator feedback regarding the content list; and
   updating the content list based on the creator feedback.

5. The method of claim 4, further comprising:
   updating the relational database based on the creator feedback.

6. The method of claim 1, further comprising:
   executing a machine learning software application to review the content list relative to the relational database; and
   updating the relational database based on a result of the machine learning software application.

7. The method of claim 1, wherein the associating the content list with the model file further comprises:
   retrieving the model file in response to the search request when the content list includes one or more terms related to the at least one search term.

8. The method of claim 1, wherein the associating the content list with the model file further comprises:
   generating tracking data for access and retrieval of the model file from a model file repository.

9. The method of claim 1, wherein the plurality of descriptor terms are hierarchical terms having hierarchical relationships defined therewith.

10. The method of claim 1, further comprising supplementing the description list with one or more visual terms from a visual inspection of the visual display of the modeling content.

11. A system for detecting modeling content within a model file without execution and construction of the model file using a modeling software executable rendering the modeling content, the system comprising:
    a memory having executable instructions stored thereon; and
    a processing device, in response to the executable instructions, operative to:
    load the model file into a detection engine, the model file including software code therein;
    electronically, via the detection engine, scan the model file and detect multiple descriptor terms associated with the software code, wherein to scan the model file does not execute the model file for rendering the modeling content;
    generate a description list for the model file based on the descriptor terms;
    review, with a conversion engine, the description list relative to a relational database, and generate multiple file terms, describing the modeling content within the model file based on input from the relational database;
    identify a layered degree of specificity of the file terms to insert a hierarchy structure into the file terms;
    generate a content list for the model file based on the file terms;
    associate the content list with the model file transmit a visual display of the modeling content to a third-party;
    receive a keyword descriptor of the model content from the third-party;
    store the keyword descriptor linked to the model file in a searchable database
    receive a search request having at least one search term to a model file repository; and
    retrieve the model file in response to receiving the search request when the search request includes the keyword descriptor according to the hierarchy structure and the content list includes one more terms related to the at least one search term.

12. The system of claim 11, the processing device in response to the executable instructions, further operative to:
    receive the model file for inclusion with a model file repository; and
    load the model file into the detection engine prior to inclusion with the model file repository.

13. The system of claim 11, the processing device in response to the executable instructions, further operative to:
    retrieve the model file from a model file repository prior to loading the model file into the detection engine; and
    associate the content list with the model file within the model file repository.

14. The system of claim 11, the processing device in response to the executable instructions, further operative to:
    present the content list to a content creator;

receive a creator feedback regarding the content list; and
update the content list based on the creator feedback.

15. The system of claim 14, the processing device in response to the executable instructions, further operative to:
   update the relational database based on the creator feedback.

16. The system of claim 11, the processing device in response to the executable instructions, further operative to:
   execute a machine learning software application to review the content list relative to the relational database; and
   update the relational database based on a result of the machine learning software application.

17. The system of claim 11, the processing device in response to the executable instructions, in associating the content list with the model file is further operative to:
   retrieve the model file in response to the search request if the content list includes one or more terms related to the at least one search term.

18. The system of claim 11, the processing device in response to the executable instructions, in associating the content list with the model file, is further operative to:
   generate tracking data for access and retrieval of the model file from a model file repository.

19. The system of claim 11, wherein the descriptor terms are hierarchical terms having hierarchical relationships defined therewith.

20. The system of claim 11, the processing device in response to the executable instructions, is further operative to:
   render the model file to create a visual display of the modeling content; and
   supplement the description list with one or more visual terms from a visual inspection of the visual display of the modeling content.

* * * * *